US012710353B2

(12) United States Patent
Smales et al.

(10) Patent No.: US 12,710,353 B2
(45) Date of Patent: Aug. 18, 2026

(54) HYDROCARBON ADSORBER TESTING DEVICE AND METHOD

(71) Applicant: CALGON CARBON CORPORATION, Moon Township, PA (US)

(72) Inventors: Matthew Piper Smales, Monroeville, PA (US); Scott Joseph Mutschler, Poland, OH (US); Philippe Westreich, Pittsburgh, PA (US); Brandon Lee Bentley, Moon Township, PA (US); Anthony Michael Rodland, Moon Township, PA (US); Joseph E. Cole, New Castle, PA (US)

(73) Assignee: CALGON CARBON CORPORATION, Moon Township, PA (US)

( * ) Notice: Subject to any disclaimer, the term of this patent is extended or adjusted under 35 U.S.C. 154(b) by 514 days.

(21) Appl. No.: 18/342,215

(22) Filed: Jun. 27, 2023

(65) Prior Publication Data

US 2023/0417653 A1 Dec. 28, 2023

Related U.S. Application Data

(60) Provisional application No. 63/367,084, filed on Jun. 27, 2022.

(51) Int. Cl.
*G01N 19/00* (2006.01)

(52) U.S. Cl.
CPC .................................... *G01N 19/00* (2013.01)

(58) Field of Classification Search
CPC ........... G01N 19/00; G01N 2203/0028; G01N 2203/0037; G01N 2203/0067; G01N 2203/0282; G01N 3/20; G01N 33/0078; G01N 33/009; G01N 33/442
See application file for complete search history.

(56) References Cited

U.S. PATENT DOCUMENTS 3,872,197 A * 3/1975 Kato .................. B29C 48/9145 425/149
RE38,844 E 10/2005 Hiltzik et al.
8,916,017 B2 * 12/2014 Natarajan ........... B32B 38/1866 156/107

(Continued)

FOREIGN PATENT DOCUMENTS

AU 2006201764 B2 * 1/2010 ......... B29B 17/0042
CN 104677770 B 2/2017
JP 3771860 B2 * 4/2006

OTHER PUBLICATIONS

Cavello "All About AC Motor Controllers—What They Are and How They Work" May 16, 2020, (5 pages) retrieved from https://web.archive.org/web/20200516022528/https://www.thomasnet.com/articles/instruments-controls/ac-motor-controllers/, entire document.

*Primary Examiner* — Kristina M Deherrera
*Assistant Examiner* — Gedeon M Kidanu
(74) *Attorney, Agent, or Firm* — DLA Piper LLP (US)

(57) ABSTRACT

A device may include a roller, a half pipe which is separated from the roller by a gap, a motor, a speed controller configured to control operation of the motor, and a drive which is operably connected to the motor and configured to rotate the roller. The device may be used in a testing method for testing an adsorbent material.

6 Claims, 6 Drawing Sheets

(56) References Cited

U.S. PATENT DOCUMENTS

| | | | | |
|---|---|---|---|---|
| 2015/0258759 | A1* | 9/2015 | Kim | B32B 37/0053 156/60 |
| 2018/0216288 | A1* | 8/2018 | Weisman | D04H 1/42 |
| 2021/0039037 | A1 | 2/2021 | Greenbank et al. | |
| 2021/0146295 | A1 | 5/2021 | Greenbank | |
| 2021/0354075 | A1* | 11/2021 | Smales | B01D 53/0415 |
| 2024/0157330 | A1* | 5/2024 | Osako | B01J 20/103 |

* cited by examiner

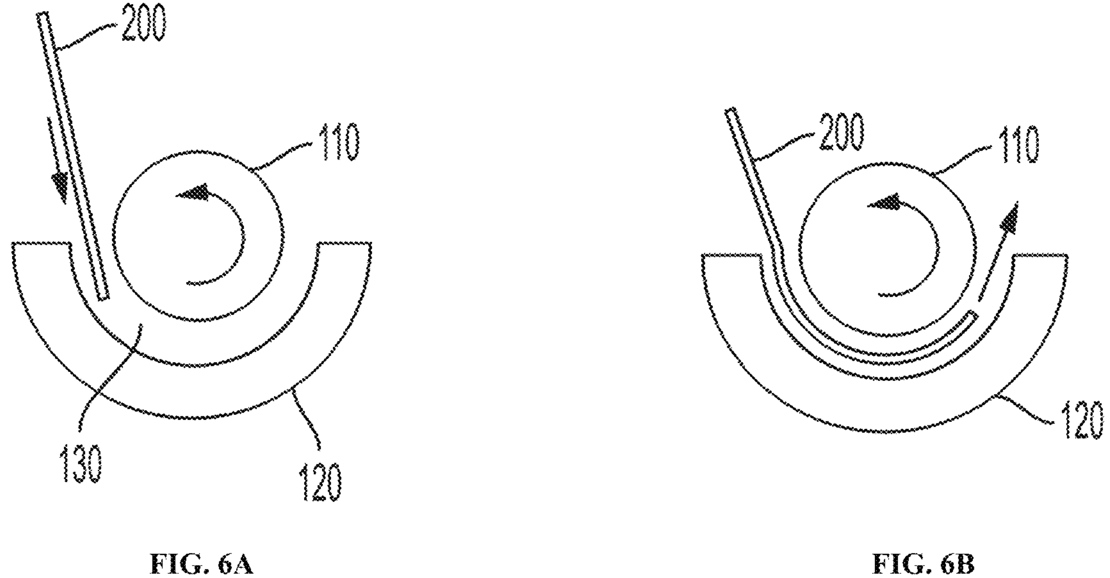
FIG. 6A
FIG. 6B
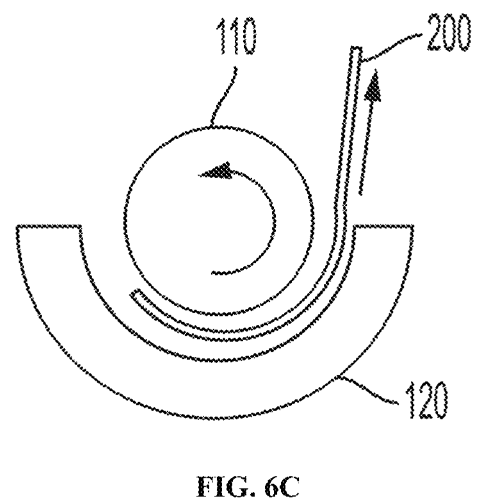
FIG. 6C

HYDROCARBON ADSORBER TESTING DEVICE AND METHOD

CROSS-REFERENCE TO RELATED APPLICATIONS

This application claims priority to U.S. Provisional Application No. 63/367,084, filed on Jun. 27, 2022, which is hereby incorporated by reference in its entirety.

FIELD

The present disclosure relates generally to devices and methods for testing automotive air intake parts. More specifically, the present disclosure relates to a device designed to test the seal strength of a hydrocarbon adsorber for automotive air intake parts.

BACKGROUND

Evaporative emissions from gasoline and other hydrocarbon fuels are a significant source of air pollution because the various hydrocarbons contained in such fuels can form photochemical smog on exposure to sunlight. These volatile organic compounds (VOCs) from gasoline vaporization cause health problems in humans and animals and lead to severe environmental damage. Evaporative emissions may occur during vehicle refueling when the "empty" fuel tank is actually filled with fuel vapors, and filling the tank with fluid displaces such vapors, when the fuel tank is heated, such as from hot ambient conditions or nearby hot exhaust systems, or during operation of the vehicle. Conventionally, these emissions are controlled by attaching a sorbent canister to the fuel tank which is in communication with the tank, the engine, and the atmosphere. While the engine is not running, the sorbent canister adsorbs excess hydrocarbon emissions from the fuel tank. Conversely, while the engine operates, the canister is purged with fresh air, which is then directed to the air intake of the engine so that the purged fuel vapors can be combusted by the engine. Previous attempts to address emission problems, such as those taught by U.S. Pat. No. RE38844E1, have employed the above strategy.

However, vehicle fuel systems include numerous ways for hydrocarbon vapors to escape and contribute to evaporative emissions. Recently, more stringent regulations on hydrocarbon emissions such as the EPA's Tier 3 Motor Vehicle Emission and Fuel Standards Program and California's LEV III Program have necessitated more effective evaporative emission prevention systems. One technique for controlling emissions in accordance with these new regulations is to place sorbent sheets within the engine air intake to adsorb the emissions from the vehicle's fuel system, such as is described in U.S. patent application Ser. No. 16/989,542, which is incorporated herein by reference in its entirety. While the design of these sheets is beneficial, there remains a need to ensure that the sheets are consistently produced and meet industry requirements. In particular, a strong edge seal is required to reinforce the sorbent sheets and prevent any damage that would cause a piece of the sorbent sheet to break off.

Testing the edge seal strength of hydrocarbon adsorbers is necessary to ensure a reliable seal. Conventional methods for edge seal testing, such as bending the hydrocarbon adsorber (HCA) parts around a cardboard tube, have been relatively simple to perform. However, such methods can suffer from inconsistent performance leading to difficulty in reproducing results, especially between different operators. In order to maintain consistency in testing and results, there is a need to develop a robust testing device and method to consistently and precisely evaluate the edge seal strength and other parameters of HCA automotive parts.

SUMMARY

There is provided a device for testing an absorbent material, the device including: a roller, a half pipe that is separated from the roller by a gap, a motor, a speed controller configured to control operation of the motor, and a drive, operably connected to the motor, configured to rotate the roller.

In some embodiments, the adsorbent material includes any of activated carbon, zeolite, silica, silica gel, carbonaceous char, alumina clay, graphite, graphene, and combinations thereof. In some embodiments, the adsorbent material has an edge seal. In some embodiments, the edge seal of the adsorbent material has a measurable strength.

In some embodiments, the roller includes any of natural rubber, synthetic rubber, isoprene rubber, styrene-butadiene rubber, neoprene rubber, butyl rubber, nitrile rubber, ethylene propylene diene rubber, silicone rubber, fluoroelastomer rubber, polyurethane rubber, hydrogenated nitrile rubber, or combinations thereof. In some embodiments, the half pipe includes any of polyethylene terephthalate, high-density polyethylene, polyvinyl chloride, low-density polyethylene, polypropylene, polystyrene, polytetrafluoroethylene, and combinations thereof.

In some embodiments, the motor is a peristaltic pump motor, a diaphragm pump motor, a centrifugal pump motor, a reciprocating pump motor, a brushed direct current motor, a brushless direct current motor, an alternating current motor, a stepper motor, a series motor, a shunt motor, or an induction motor. In some embodiments, the drive is a chain drive, a gear drive, or a belt drive. In some embodiments, the roller is configured to rotate at a variable angular velocity. In some embodiments, the roller is configured to rotate at an angular velocity of between about 1 revolution per minute and about 100 revolutions per minute. In some embodiments, the roller has a diameter of about 20 mm to about 100 mm. In some embodiments, rollers of different diameters may be used in the device. In some embodiments, the gap between the roller and the half pipe is between about 1 mm and about 10 mm.

In some embodiments, there is provided a method of testing an adsorbent material, the method including: loading the adsorbent material into a testing device, the testing device including a roller, a half pipe that is separated from the roller by a gap, a motor, a speed controller configured to control operation of the motor, and a drive, operably connected to the motor, configured to rotate the roller, and testing the adsorbent material.

In some embodiments, the adsorbent material has an edge seal. In some embodiments, testing the adsorbent material includes measuring a strength of the edge seal of the adsorbent material. In some embodiments, measuring a strength of the edge seal includes observing a deformation of the edge seal, a material failure, an edge seal failure, or combinations thereof. In some embodiments, loading the adsorbent material into a testing device includes placing the adsorbent material between the roller and the half pipe.

BRIEF DESCRIPTION OF THE DRAWINGS

Aspects, features, benefits, and advantages of the embodiments described herein will be apparent with regard to the following description, appended claims, and accompanying drawings where:

FIGS. 6A-6C are illustrative depictions of the operation of a hydrocarbon adsorber testing device.

DETAILED DESCRIPTION

This disclosure is not limited to the particular systems, devices and methods described, as these may vary. The terminology used in the description is for the purpose of describing the particular versions or embodiments only and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The present disclosure describes a device and method for testing the edge seal strength of hydrocarbon adsorber (HCA) parts for automotive air intake systems or other filter configurations. This type of testing is typically carried out by bending an HCA part around a cardboard tube, which results in a lack of consistency and reproducibility. It was previously not possible to fully standardize this testing method between different runs and different operators, leading to inconsistent results.

In addressing this problem, the present disclosure describes a device that is capable of wrapping an HCA part around a cylindrical roller having a defined radius, rotating the cylindrical roller, and allowing the operator to control the speed of rotation in order to observe the strength of the HCA part. In particular, the device may enable a determination as to whether the edge seal remains intact during testing or whether it exhibits failure. The device may include a roller of a defined radius that is set within a half pipe. The roller and half pipe may be separated by a gap. The gap may represent a substantially consistent radial distance between the roller and the half pipe. The system may further include a drive powered by a motor. The HCA part to be tested may be loaded into the device by placing the HCA part into the gap between the roller and the half pipe. Placing the HCA part in this manner may allow the roller to pull the HCA part into the device. The HCA part wraps around the roller until it exits the device on the opposite side from which it entered. The wrapping of the HCA part around the roller induces a shear stress on the edge seal of the HCA part. The edge seal may then be evaluated by the operator to determine whether the edge seal remains intact after wrapping.

Figure 1:
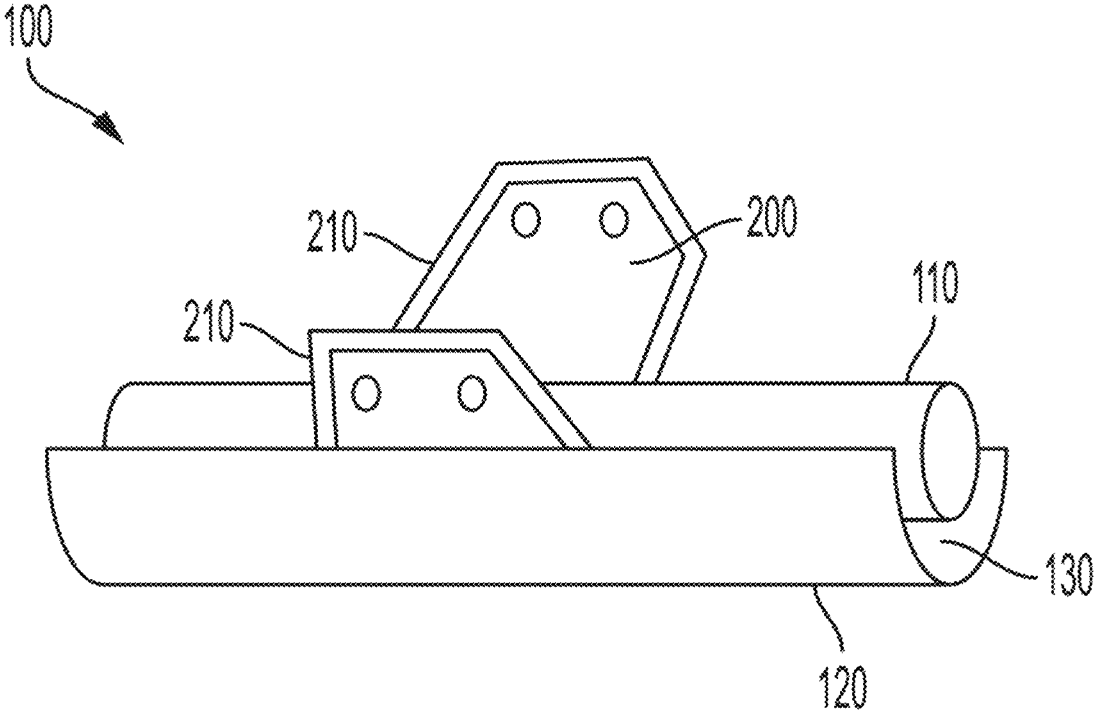
FIG. 1 depicts an illustrative hydrocarbon adsorber testing device in accordance with an embodiment.

A hydrocarbon adsorber testing device 100 is shown in FIG. 1. The device includes a roller 110 and a half pipe 120 that cradles the roller. The roller 110 may have a diameter within a range of about 20 mm to about 100 mm. For example, the diameter of the roller 110 may be about 20 mm, about 25 mm, about 35 mm, about 40 mm, about 45 mm, about 50 mm, about 55 mm, about 60 mm, about 65 mm, about 70 mm, about 75 mm, about 80 mm, about 85 mm, about 90 mm, about 95 mm, about 100 mm, or within a range between any two of such values. The roller 110 may be made of natural rubber, synthetic rubber, isoprene rubber, styrene-butadiene rubber, neoprene rubber, butyl rubber, nitrile rubber, ethylene propylene diene rubber, silicone rubber, fluoroelastomer rubber, polyurethane rubber, hydrogenated nitrile rubber, or combinations thereof. The roller 110 may be made of any material that allows sufficient traction between the roller and the HCA part 200 such that the HCA part wraps around the roller. The gap 130 between the roller 110 and the half pipe 120 may be within a range of about 1 mm to about 10 mm. For example, the gap 130 between the roller 110 and the half pipe 120 may be about 1 mm and about 10 mm, such as about 1 mm, about 2 mm, about 3 mm, about 4 mm, about 5 mm, about 6 mm, about 7 mm, about 8 mm, about 9 mm, about 10 mm, or within a range between any two of such values. The roller 110 may be replaced with a different roller having a different diameter to create a gap having a different radial distance and permit the testing of hydrocarbon adsorbers with various thickness.

A hydrocarbon adsorber part (HCA part) 200 may be placed in the gap 130 between the roller 110 and the half pipe 120 on one side of the testing device. The HCA part 200 may include an edge seal 210, which is evaluated during and after testing. In some embodiments, the HCA part 200 part includes one or more sheets of adsorbent material and has an edge seal. In some embodiments, the HCA part 200 includes a single sheet of adsorbent material that is folded such that it has an edge seal. In some embodiments, the HCA part 200 includes multiple sheets of adsorbent material that are folded such that the HCA part 200 has an edge seal. In some embodiments, the HCA part 200 includes one or more sheets of adsorbent material sandwiched between layers of porous cover material which has an edge seal. In some embodiments, the HCA part 200 includes multiple sheets of adsorbent material which are held together by an edge seal. In some embodiments, the HCA part 200 includes multiple sheets of adsorbent material which are sandwiched between layers of porous cover material which has an edge seal.

The testing device 100 may further include a motor 140, a speed controller 150, and a drive 160. In some embodiments, the speed controller 150 may be operably connected to the motor 140 by a connection 190 and configured to regulate the operation of the motor. In some embodiments, the motor 140 may be operably connected to a drive 160 and configured to cause the drive to rotate the roller 110 at a known rotational velocity. In some embodiments, the motor 140 is a peristaltic pump motor, a diaphragm pump motor, a centrifugal pump motor, a reciprocating pump motor, a brushed direct current motor, a brushless direct current motor, an alternating current motor, a stepper motor, a series motor, a shunt motor, or an induction motor. Any motor which can be configured to rotate a roller as described herein is within the scope of the present disclosure. In some embodiments, the drive 160 is a chain drive, a gear drive, or a belt drive. For example, the motor may cause the drive 160 to rotate the roller 110 at about 1 revolution per minute (rpm), about 2 rpm, about 3 rpm, about 4 rpm, about 5 rpm, about 6 rpm, about 7 rpm, about 8 rpm, about 9 rpm, about 10 rpm, about 15 rpm, about 20 rpm, about 25 rpm, about 30 rpm, about 35 rpm, about 40 rpm, about 45 rpm, about 50 rpm, about 60 rpm, about 70 rpm, about 80 rpm, about 90 rpm, about 100 rpm, or within a range between any two of such values. For example, the angular velocity of the roller 110 may be between about 1 rpm and about 100 rpm.

The roller 110 and half pipe 120 are mounted onto a base 180 and contained within a frame 170. When the roller 110 is in operation, the HCA part 200, which is placed in the gap 130 between the roller and the half pipe 120 on one side of the device 100, is wound around the roller and pulled into and through the device.

Figure 3:
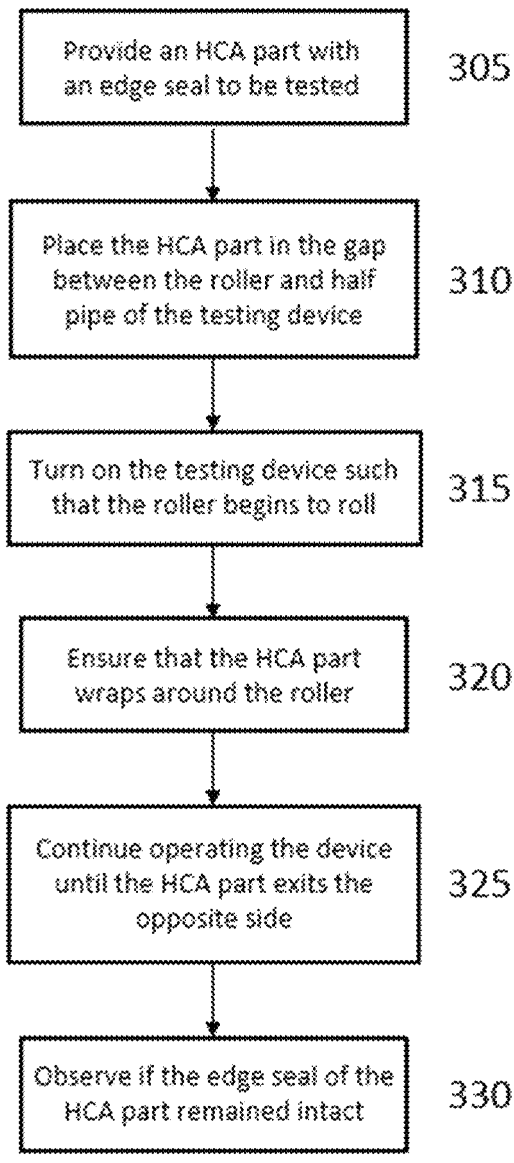
FIG. 3 is a flow chart of an illustrative method of testing a hydrocarbon adsorber part in accordance with an embodiment.

FIG. 3 is a flow chart describing the steps of operating the testing device. The operator begins by providing 305 an HCA part with an edge seal to be tested. The HCA part may include one or more sheets of adsorbent material and have an edge seal. The HCA part may include one or more sheets of adsorbent material sandwiched between layers of porous cover material such that it has an edge seal, or the HCA part may include multiple sheets of adsorbent material held together with an edge seal. The HCA part is placed 310 in the gap between the roller and the half pipe of the device. The device is turned on 315 when the motor is activated, which causes the roller to begin to rotate. The speed at which the roller rotates may be controlled with the speed controller. The HCA part wraps around 320 the roller as it rolls, allowing the rotation of the roller to pull the HCA part into the testing device. The device continues to operate 325 until the HCA part exits the gap between the roller and the half pipe on the opposite side from which it entered. At this point, the operator may optionally turn the testing device off. The edge seal of the HCA part is observed 330 by an operator to determine if it has remained intact or exhibited failure while in the testing device. Exhibiting failure may include observing a deformation of the edge seal, a material failure, an edge seal failure, or combinations thereof. The HCA part is evaluated on a pass/fail basis and any exhibition of failure, regardless of degree, constitutes failure of the HCA part.

Figure 4:
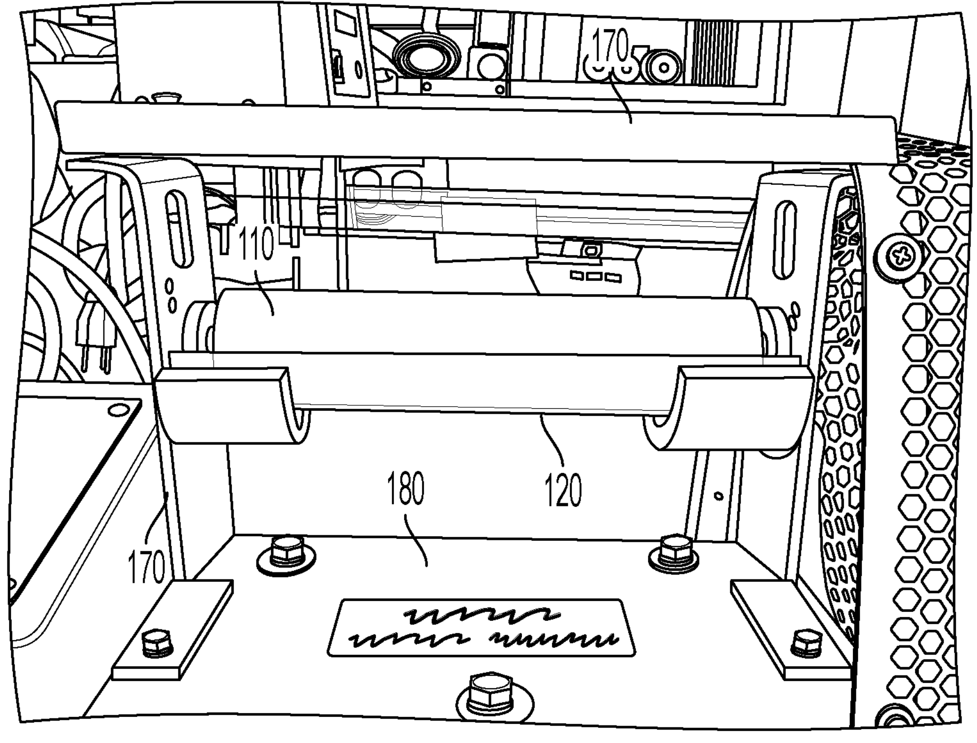
FIG. 4 is an image of a hydrocarbon adsorber testing device.
Figure 5:
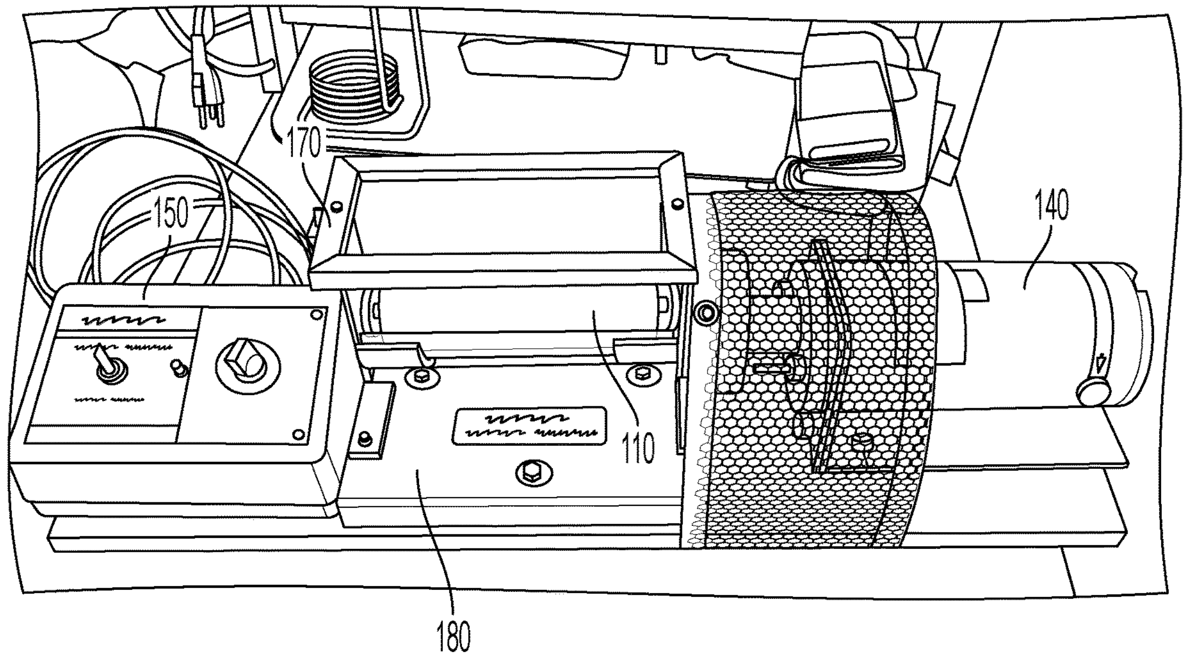
FIG. 5 is an image of a system including a hydrocarbon adsorber testing device.

FIGS. 4 and 5 are images of embodiments of a hydrocarbon adsorber testing device depicting the roller 110, the half pipe 120, the motor 140, the speed controller 150, the frame 170, and the base 180.

FIG. 6A depicts the HCA part 200 being placed in the gap 130 between the roller 110 and the half pipe 120. As shown, the HCA part 200 is placed into the gap 130 on the left side of the device, and the roller 110 rotates (in this depiction, counterclockwise) to pull the HCA part into the device. As shown in FIG. 6B, the rotation of the roller 110 continually moves the HCA part 200 through the device, wrapping the HCA part around the roller. Wrapping the HCA part 200 around the roller 110 induces a shear stress on the HCA part. FIG. 6C shows the HCA part 200 beginning to exit the testing device on the right side, after being wrapped around the roller 110 and pulled through the device. Upon the exit of the HCA part 200 from the device, the device may be turned off, and the HCA part may be examined to determine whether the edge seal of the HCA part remained intact or exhibited failure during testing. An observation that the edge seal remains intact, or that the edge seal exhibits failure, is considered a measurement of the strength of the edge seal. The testing method may be repeated as necessary.

In some embodiments, there is provided a device for testing an absorbent material, the device including: a roller, a half pipe that is separated from the roller by a gap, a motor, a speed controller configured to control operation of the motor, and a drive, operably connected to the motor, configured to rotate the roller.

In some embodiments, the adsorbent material is any of activated carbon, zeolite, silica, silica gel, carbonaceous char, alumina clay, graphite, graphene, and combinations thereof.

In some embodiments, the adsorbent material has an edge seal.

In some embodiments, the roller includes any of natural rubber, synthetic rubber, isoprene rubber, styrene-butadiene rubber, neoprene rubber, butyl rubber, nitrile rubber, ethylene propylene diene rubber, silicone rubber, fluoroelastomer rubber, polyurethane rubber, hydrogenated nitrile rubber, or combinations thereof.

In some embodiments, the half pipe includes any of polyethylene terephthalate, high-density polyethylene, polyvinyl chloride, low-density polyethylene, polypropylene, polystyrene, polytetrafluoroethylene, and combinations thereof.

In some embodiments, the gap between the roller and the half pipe is between about 1 mm and about 10 mm.

In some embodiments, the motor is a peristaltic pump motor, a diaphragm pump motor, a centrifugal pump motor, a reciprocating pump motor, a brushed direct current motor, a brushless direct current motor, an alternating current motor, a stepper motor, a series motor, a shunt motor, or an induction motor.

In some embodiments, the drive is a chain drive, a gear drive, or a belt drive.

In some embodiments, the speed controller and the drive are configured to rotate the roller at a variable angular velocity.

In some embodiments, the angular velocity of the roller is between about 1 revolution per minute and about 100 revolutions per minute.

In some embodiments, the roller has a diameter of about 20 mm to about 100 mm.

In some embodiments, the roller may be replaced with a roller having a different diameter.

In some embodiments, there is provided a method of testing an adsorbent material, the method including: loading the adsorbent material into a testing device, the testing device including a roller, a half pipe that is separated from the roller by a gap, a motor, a speed controller configured to control operation of the motor, and a drive, operably connected to the motor, configured to rotate the roller, and testing the adsorbent material.

In some embodiments, the adsorbent material is any of activated carbon, zeolite, silica, silica gel, carbonaceous char, alumina clay, graphite, graphene, and combinations thereof.

In some embodiments, the adsorbent material has an edge seal.

In some embodiments, the edge seal has a measurable strength.

In some embodiments, loading the adsorbent material into a testing device includes placing the adsorbent material between the roller and the half pipe.

In some embodiments, testing the adsorbent material includes wrapping the adsorbent material around the roller and measuring a strength of an edge seal of the adsorbent material.

In some embodiments, testing the adsorbent material provides a measurement of an edge seal strength of the adsorbent material.

In some embodiments, testing the absorbent material includes observing a deformation of an edge seal, a material failure, an edge seal failure, or combinations thereof.

EXAMPLES

Example 1

The device was constructed by modifying a cold roll laminator by removing the top roller and cradling the bottom roller with a PVC half pipe. The gap between the roller and half pipe is approximately 2 mm, allowing an HCA part being tested to wrap tightly around the roller. The roller has a diameter of about 40 mm and is configured to be rotated by a drive and a peristaltic pump motor. For some tests, the roller was replaced with a roller having a diameter of about 60 mm. The speed of the roller is controlled with a variable speed controller, capable of 1 to 100 revolutions per minute (rpm). The testing of the HCA part was conducted at about 15 rpm to about 25 rpm. The testing method takes about 4 seconds to about 15 seconds from the time the HCA part enters the device until the time when the HCA part exits the device. The testing method can be repeated on a single HCA part as necessary.

Figure 2:
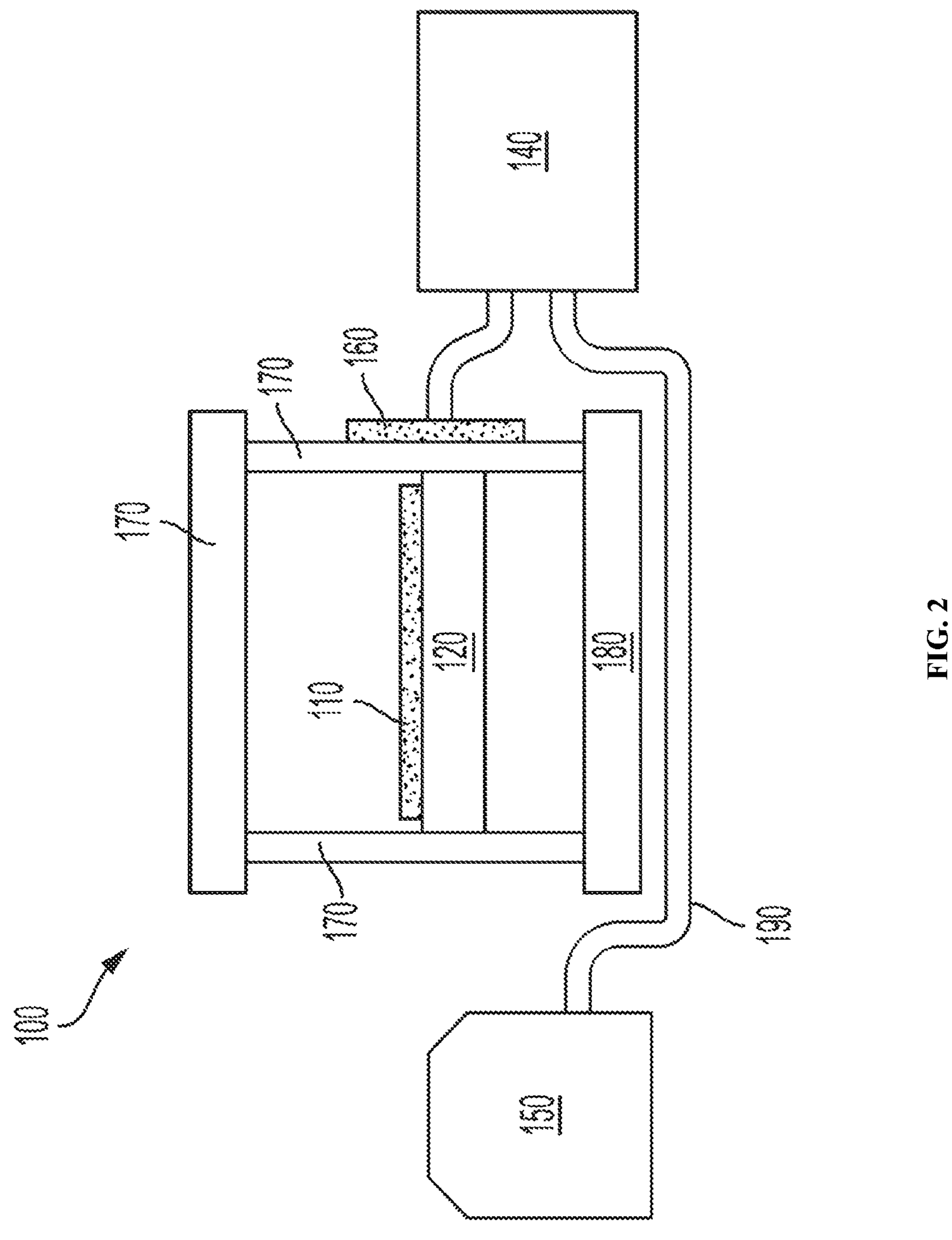
FIG. 2 depicts an illustrative system including a hydrocarbon adsorber testing device in accordance with an embodiment.

FIGS. 4 and 5 are images of the device constructed from a modified cold roll laminator with a PVC half pipe, depicting the roller 110, the half pipe 120, the motor 140, the speed controller 150, the frame 170, and the base 180. The gap 130 between the roller 110 and the half pipe 120, the drive 160, and the operable connection 190 between the speed controller 150 and the motor 140 are depicted in FIG. 2.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 compounds refers to groups having 1, 2, or 3 compounds. Similarly, a group having 1-5 cells refers to groups having 1, 2, 3, 4, or 5 compounds, and so forth.

Various of the above-disclosed and other features and functions, or alternatives thereof, may be combined into many other different systems or applications. Various presently unforeseen or unanticipated alternatives, modifications, variations, or improvements therein may be subsequently made by those skilled in the art, each of which is also intended to be encompassed by the disclosed embodiments.

What is claimed is:

1. A method for testing an adsorbent material, the method comprising:

loading the adsorbent material into a testing device, the testing device comprising:

a roller, a half pipe that is separated from the roller by a gap, a motor, a speed controller configured to control operation of the motor, and a drive, operably connected to the motor, configured to rotate the roller, and testing the adsorbent material, wherein testing the adsorbent material provides a measurement of an edge seal strength of the adsorbent material, wherein testing the adsorbent material comprises wrapping the adsorbent material around the roller and measuring a strength of an edge seal of the adsorbent material.

2. The method of claim 1, wherein the adsorbent material is any of activated carbon, zeolite, silica, silica gel, carbonaceous char, alumina clay, graphite, graphene, and combinations thereof.

3. The method of claim 1, wherein the adsorbent material has an edge seal.

4. The method of claim 3, wherein the edge seal of the adsorbent material has a measurable strength.

5. The method of claim 1, wherein loading the adsorbent material into the testing device comprises placing the adsorbent material between the roller and the half pipe.

6. The method of claim 1, wherein testing the adsorbent material comprises observing a deformation of an edge seal, a material failure, an edge seal failure, or combinations thereof.

* * * * *